July 2, 1935.  G. LYNCH  2,007,129
VIBRATION ABSORBER FOR INDICATORS
Filed July 14, 1932
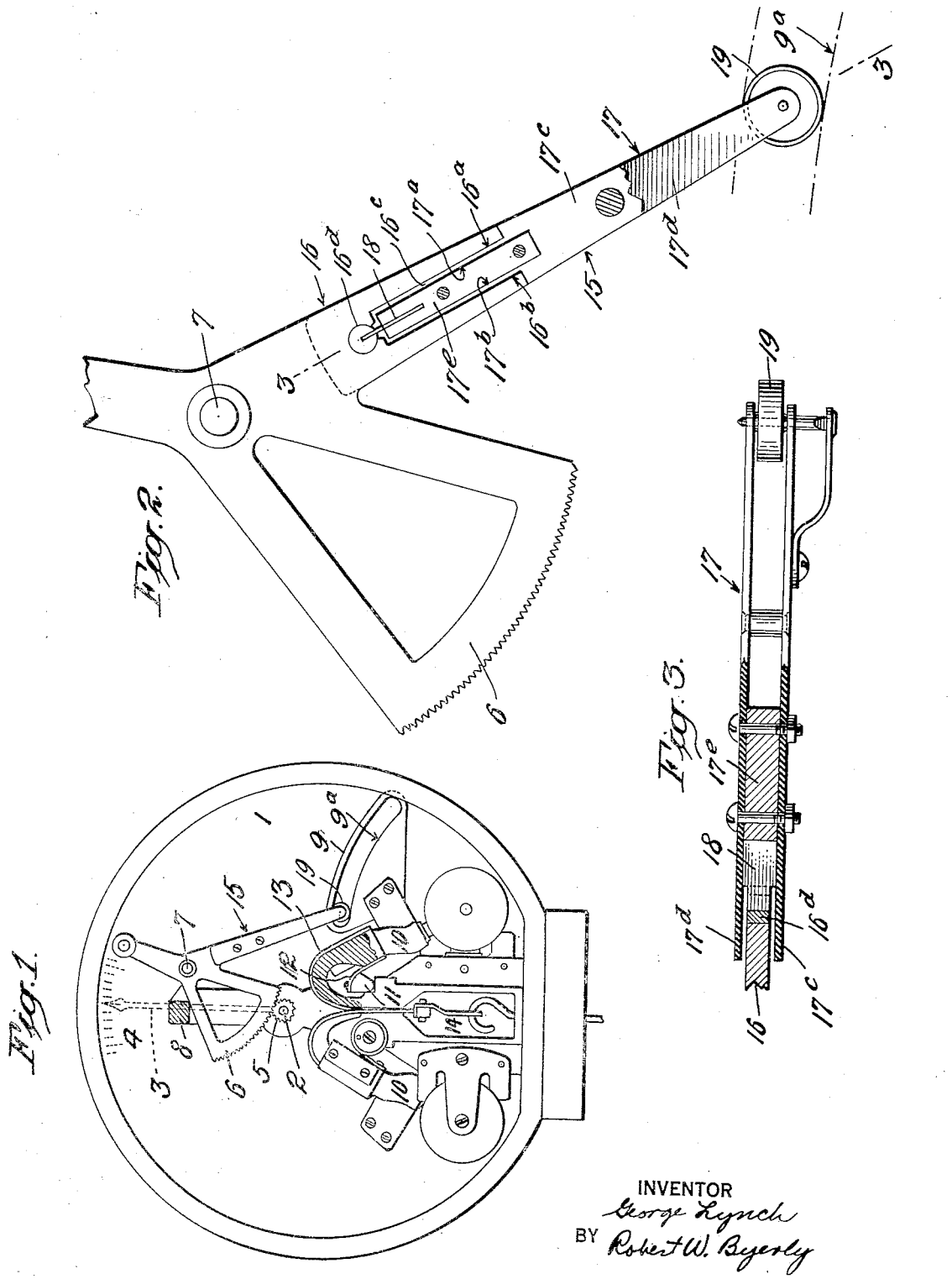
INVENTOR
George Lynch
BY Robert W. Byerly
ATTORNEY Patented July 2, 1935

2,007,129

UNITED STATES PATENT OFFICE 2,007,129

VIBRATION ABSORBER FOR INDICATORS

George Lynch, Brooklyn, N. Y., assignor to The Kron Company, Bridgeport, Conn., a corporation of Connecticut Application July 14, 1932, Serial No. 622,399

8 Claims. (Cl. 265—62)

This invention relates to a vibration-absorbing operating means for the indicators of weighing scales and the like.

In weighing scales having indicators such as pointers, and particularly those in which the operation of the indicator is caused by the movement of weighted arms supported from fulcrum blocks and operated from a platform, scale-pan or the like, the indicators are subject to vibration caused by shocks or jars in the buildings in which the scales are used. Such vibration appears to be due largely to the delicate poised mechanism of the scale. The object of my invention is to provide an operating means for the indicator of such a scale which protects the indicator from shocks or jars to which the scale as a whole is subjected, and thus prevents vibration of the indicator.

In accordance with my invention, the indicator is operated through a resilient member which has sufficient stiffness to transmit the usual actuating force to the indicator without appreciable yielding, and which is at the same time sufficiently flexible to yield under shocks and jars and thus absorb such shocks and avoid transmitting them to the indicator. The yielding of the resilient member is most desirably closely limited in each direction to insure accurate positioning of the pointer and the immediate damping out of any oscillating movement which might be acquired by the resilient member.

An illustrative embodiment of my invention is shown in the accompanying drawing, in which:

Fig. 1 is a partially sectioned elevation of a scale mechanism embodying my invention;

Fig. 2 is an enlarged view of part of the mechanism shown in Fig. 1; and

Fig. 3 is a section on the line 3—3 of Fig. 2.

Fig. 1 of the drawing shows part of a weighing scale having a casing or frame 1, in which is pivoted a shaft 2, carrying an indicator or pointer 3, adapted to sweep in front of a suitable dial 4. A pinion 5 is secured on the shaft 2, and meshes with an arcuate rack 6 pivoted at 7 on a standard 8 in the casing 1. An actuator for the pointer is shown in the form of a cam 9, which is connected with a weighted arm 10 hung from a fulcrum block 11 by means of a flexible strip 12. By a flexible strip 13, the arm 10 is connected with a pulling device 14 to be connected with a scale platform, scale-pan or the like, so that, when the arm is operated by a weight on the platform or pan, the cam 9 will be moved so that it may be used to actuate the indicator 3. Fig. 1 shows two weighted arms 10 and corresponding fulcrum blocks and flexible strips. The parts thus far described may be of any usual or suitable structure.

To provide for operation of the indicator 3 by the actuator 9 and at the same time to prevent the transfer of shocks or vibration from the actuator to the indicator, I connect the actuator 9 with the rack 6 by means of an arm 15 which is integral in the sense that all its parts are rigidly connected together, and which, at the same time, has a limited lateral flexibility and resiliency which enables it to absorb shocks. The arm 15 has two rigid parts 16 and 17 connected by a resilient element 18. The inner rigid portion 16 of the arm is fixed to or made in one piece with the rack 6, while the outer rigid portion 17 of the arm carries a roller 19 engaging the rack or actuator 9. The connecting element 18 most desirably consists of a leaf spring laterally flexible in the plane of the rack 6. The flexing of the arm 15 as a whole, and the flexing of the leaf spring 18, in each direction, is limited by the engagement of stops or stop surfaces 16a, 16b, on the part 16, with opposed stops or stop surfaces 17a, 17b on the part 17.

In the particular construction shown, the part 17 consists of spaced plates 17c, 17d, holding between them a block or tongue 17e, in one end of which is a slot in which one end of the spring 18 is seated and fixed. The part 16 is bifurcated to provide a longitudinal slot 16c which receives the tongue 17e and is slightly wider than the tongue. At the inner end of the slot 16c, a stud 16d is fixed in the part 16. This stud contains a radial slot for receiving and holding one end of the spring 18. The plates 17c and 17d are preferably of sufficient length to enclose and protect the bifurcated portion of the part 16 and the stud 16d.

The pivoted member constituted by the rack 6 and the arm 15 has its center of gravity slightly to the right of its pivot 7, so that the roller 19 rests on the surface 9a of the cam 9 during the operation of the scale. In the operation of the scale, there is, therefore, a slight stress on the arm 15 tending to flex it by moving its outer part 17 to the right and upwardly with respect to its arm 16. When the arm 15 is assembled, before it is placed in the scale mechanism, the stud 16d is turned so that the spring 18 holds the surface 17b of the tongue 17e in contact with the surface 16b of the slot 16c. The spring 18 is of such strength that, when the arm 15 is placed in the scale mechanism, the slight torsional strain on the arm moves the tongue 17e against the resistance of the spring 18 to the middle of the slot 16c, as shown in Fig. 2. Consequently, in the normal operation of the device, the spring 18 serves as the sole means for connecting the parts 16 and 17 of the arm and is free to move to absorb vibration. At the same time, oscillation of the spring and the possibility of inaccurate positioning of the pointer are prevented by the engagement between the tongue 17e and the slot 16c in the case of any large flexing of the spring 18.

What I claim is:

1. In a weighing scale, the combination of an indicator and an actuator therefor and means connecting the actuator with the indicator, said means comprising a freely held leaf spring having a sufficient stiffness to transmit ordinary movements of the actuator to the indicator and sufficient resiliency to absorb vibration transmitted by the actuator, and means closely limiting the yielding of said spring in each direction.

2. In a weighing scale, the combination of an indicator and an actuator therefor, means connecting the actuator with the indicator comprising an arm consisting of two rigid parts and a laterally flexible and resilient element connecting said parts and having its ends rigidly secured to said parts respectively and means normally out of contact with said arm limiting the lateral flexing of said resilient member.

3. In a weighing scale, the combination with an indicator and an actuator therefor, of operating means connecting the actuator with the indicator and comprising an arm consisting of two rigid parts, a laterally flexible and resilient element connecting said parts, and cooperating stops on said parts normally out of contact with one another limiting the flexing of said resilient element in both directions.

4. In a weighing scale, the combination with an indicator and an actuator therefor, of operating means connecting the actuator with the indicator and comprising an arm subjected to rotary strain and consisting of a bifurcated member having a tongue held between said bifurcations and normally out of contact therewith by a freely held resilient member positioned between said bifurcations.

5. A vibration-absorbing operating means for an indicator, comprising an arm consisting of a bifurcated part, a tongued part fitting loosely therein, and a laterally flexible resilient element extending between the bifurcations of said bifurcated part and connecting said first part to said tongued part.

6. A vibration-absorbing operating means for an indicator, comprising a part having a longitudinal slot extending to its outer end, a part having a tongue fitting between, and limited in lateral movement by, the sides of said slot, and a leaf spring having one of its ends secured in the outer end of said tongue and the other of its ends secured at the inner end of said slot.

7. A vibration-absorbing operating means for an indicator, comprising a part having a longitudinal slot extending to its outer end, a part having a tongue fitting between, and limited in lateral movement by, the sides of said slot, a leaf spring having one of its ends secured in the outer end of said tongue and the other of its ends secured at the inner end of said slot, and side plates secured to said tongue and embracing said slot and said spring.

8. A vibration-absorbing operating means for indicators, comprising loosely interfitting parts capable of a limited relative lateral movement, one of said parts containing a longitudinal slot in one of its ends, a circular stud set in the other of said parts and containing a radial slot, and a leaf spring connecting said parts and having its ends set in said radial slot and in said longitudinal slot.

GEORGE LYNCH.